(12) United States Patent
Fitzmaurice et al.

(10) Patent No.: US 7,205,991 B2
(45) Date of Patent: Apr. 17, 2007

(54) GRAPHICAL USER INTERFACE WIDGETS VIEWABLE AND READABLE FROM MULTIPLE VIEWPOINTS IN A VOLUMETRIC DISPLAY

(75) Inventors: George William Fitzmaurice, Toronto (CA); Ravin Balakrishnan, Toronto (CA); Gordon Paul Kurtenbach, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 476 days.

(21) Appl. No.: 10/183,968

(22) Filed: Jun. 28, 2002

(65) Prior Publication Data
US 2003/0142092 A1 Jul. 31, 2003

Related U.S. Application Data

(60) Provisional application No. 60/350,952, filed on Jan. 25, 2002.

(51) Int. Cl.
*G06T 15/00* (2006.01)

(52) U.S. Cl. .......................... 345/419; 345/6; 345/169; 348/36

(58) Field of Classification Search ................ 345/419, 345/6, 30–32, 156, 169–171; 348/36–42
See application file for complete search history.

(56) References Cited

U.S. PATENT DOCUMENTS

| | | | | |
|---|---|---|---|---|
| 4,134,104 | A | 1/1979 | Karras | 340/324 |
| 4,160,973 | A | 7/1979 | Berlin, Jr. | 340/718 |
| 5,717,415 | A | 2/1998 | Iue et al. | 345/8 |
| 5,767,854 | A | 6/1998 | Anwar | 345/355 |
| 5,805,137 | A | 9/1998 | Yasutake | 345/156 |
| 5,854,449 | A | 12/1998 | Adkins | 178/18.02 |
| 6,008,809 | A | 12/1999 | Brooks | 345/342 |
| 6,031,541 | A | 2/2000 | Lipscomb et al. | 345/425 |
| 6,049,317 | A | 4/2000 | Thompson | 345/85 |
| 6,052,100 | A * | 4/2000 | Soltan et al. | 345/6 |
| 6,064,423 | A | 5/2000 | Geng | 348/36 |
| 6,115,028 | A | 9/2000 | Balakrishnan et al. | 345/157 |
| 6,208,318 | B1 | 3/2001 | Anderson et al. | 345/139 |
| 6,229,542 | B1 | 5/2001 | Miller | 345/358 |
| 6,512,498 | B1 * | 1/2003 | Favalora et al. | 345/30 |
| 6,628,298 | B1 * | 9/2003 | Debevec | 345/632 |
| 6,697,034 | B2 * | 2/2004 | Tashman | 345/31 |
| 6,753,847 | B2 * | 6/2004 | Kurtenbach et al. | 345/156 |
| 6,842,175 | B1 * | 1/2005 | Schmalstieg et al. | 345/427 |
| 2002/0008676 | A1 | 1/2002 | Miyazaki et al. | |

OTHER PUBLICATIONS

Balakrishman et al., "User Interfaces for Volumetric Displays," pp. 37-45, Mar. 2001, IEEE.*

(Continued)

*Primary Examiner*—Phu K. Nguyen
(74) *Attorney, Agent, or Firm*—Staas & Halsey LLP (57) ABSTRACT

The present invention is a widget display system for a volumetric or true three-dimensional (3D) display that provides a volumetric or omni-viewable widget that can be viewed and interacted with from any location around the volumetric display. The widget can be viewed from any location by duplicating the widget such that all locations around the display are within the viewing range of the widget. A widget can be provided with multiple viewing surfaces or faces making the widget omni-directional. A widget can be continuously rotated to face all of the possible locations of users over a period of time. User locations can be determined and the widget can be oriented to face the users when selected.

11 Claims, 9 Drawing Sheets

OTHER PUBLICATIONS

Hobbs et al. A User Interface To A Rrue 3-D Display Device, Proceedings of 5th International Conference on Human-Computer Interaction, Aug. 1993, pp. 579-584.*

Grossman et al. Multi-Finger Gestural interaction with 3D Volumetric Displays, UIST, ACM 2004, Oct. 2004, pp. 61-70.*

W. Buxton and G.W. Fitzmaurice, "HMD's, Caves, and Chameleon: A Human-Centric Analysis of Interaction in Virtual Space," Computer Graphics, vol. 32, No. 4, 1998, pp. 64-68.

M. Czernuszenko et al., "The ImmersaDesk and Infinity Wall Projection-Based Virtual Reality Displays," Computer Graphics, vol. 31, No. 2, 1997, pp. 46-49.

D. Ebert et al., "Realizing 3D Visualization using Crossed-Beam Volumetric Displays," Comm. ACM, vol. 42, No. 8, 1999, pp. 101-107.

M. Lucente, "Interactive Three-Dimensional Holographic Displays: Seeing the Future in Depth," Computer Graphics, May 1997, pp. 63-67.

M. Sinclair, "The Haptic Lens," Proc. Siggraph 97, ACM Press, New York, 1997, p. 179.

T. Murakami and N. Nakajima, "Direct and Intuitive Input Device for 3D Shape Deformation," Proc. Computer- Human Interaction (CHI 94), ACM Press, New York, 1994, pp. 465-470.

R. Balakrishnan et al., "The Rockin'Mouse: Integral 3D Manipulation on a Plane," Proc. Computer-Human Interaction (CHI 97), ACM Press, New York, 1997, pp. 311-318.

G. Fitzmaurice, H. Ishii, and W. Buxton, "Bricks: Laying the Foundations for Graspable User Interfaces," Proc. Computer-Human Interaction (CHI 95), ACM Press, New York, 1995, pp. 442-449.

S. Zhai, W. Buxton, and P. Milgram, "The 'Silk Cursor': Investigating Transparency for 3D Target Acquisition," Proc. Computer-Human Interaction (CHI 94), ACM Press, New York, 1994, pp. 459-464.

B. Conner et al., "Three Dimensional Widgets," Computer Graphics, vol. 22, No. 4, 1992, pp. 121-129.

G. Fitzmaurice et al., "An Exploration into Supporting Artwork Orientation in the User Interface," Proc. Computer-Human Interaction (CHI 99), ACM Press, New York, 1999, pp. 167-174.

Ken-ichi Kameyama, et al.,"Virtual Surgical Operation System Using Volume Scanning Display", Image Capture, Formatting, and Display, SPIE, vol. 2164, Medical Imaging 1994, pp. 146-154.

Michael Halle, "Autostereoscopic Displays and Computer Graphics", Computer Graphics, ACM SIGGRAPH, 31(2), May 1997, pp. 58-62.

Gregg Favalora et al., "Volumetric Three-Dimensional Display System with Rasterization Hardware", SPIE, vol. 4297A, Feb. 2001.

E. Sachs, A. Roberts and D. Stoops, "3-Draw: A Tool for the Conceptual Design of Three Dimensional Shape", IEEE Computer Graphics and Applications, Jan. 1990.

K. Kameyama and K. Ohtomi, "A Direct 3-D Shape Modeling System", IEEE, pp. 519-524, 1993.

J. Viega et al., "3D Magic Lenses", UIST 1996, Seattle, Washington, pp. 51-58.

K. Kameyama, K. Ohtomi and Y. Fukui, "Interactive Volume Scanning 3-D Display with an Optical Relay System and Multidimensional Input Devices", SPIE vol. 1915 Stereoscopic Displays and Applications IV (1993), pp. 12-20.

K. Kameyama and K. Ohtomi, "A Shape Modeling System with a Volume Scanning Display and Multisensory Input Device", Presence: vol. 2, No. 2, 1993, pp. 104-111.

K. Kameyama and K. Ohtomi, "VR System Using Volume Scanning Display and Multi-Dimensional Input Device", ISMCR, Nov. 1992, pp. 473-479.

K. Kameyama, K. Ohtomi and Yukio Fukui, "A Virtual Reality System Using a Volume Scanning 3D Display", 1991.

* cited by examiner

170 — DETERMINE USER VIEWPOINTS
172 — CREATE WIDGETS AND ORIENT
174 — DETERMINE CENTROID
176 — MOVE INTERSECTING WIDGETS ALONG NOMIAL

GRAPHICAL USER INTERFACE WIDGETS VIEWABLE AND READABLE FROM MULTIPLE VIEWPOINTS IN A VOLUMETRIC DISPLAY

CROSS-REFERENCE TO RELATED APPLICATION(S)

This application is related to and claims priority to U.S. provisional application entitled User Interfaces For Volumetric Displays, having Ser. No. 60/350,952, by Kurtenbach et al, filed Jan. 25, 2002, this application is also related to U.S. application entitled Three Dimensional Volumetric Display Input And Output Configurations, having Ser. No. 10/183,970, by Kurtenbach et al, filed concurrently herewith, to U.S. application entitled Volume Management System For Volumetric Displays, having Ser. No. 10/183,966, by Kurtenbach et al, filed herewith, to U.S. application entitled Widgets Displayed and operable on a surface of a volumetric display enclosure, having Ser. No. 10/183,945, by Fitzmaurice et al, filed concurrently herewith, to U.S. application entitled A System For Physical Rotation of Volumetric Display Enclosures To Facilitate Viewing, having Ser. No. 10/188,765, by Balakrishnan et al, filed concurrently herewith, to U.S. application entitled Techniques For Pointing To Locations Within A Volumetric Display, having Ser. No. 10/183,944, by Balakrishnan et al, filed concurrently herewith and all of which are incorporated by reference herein.

BACKGROUND OF THE INVENTION

1. Field of the Invention

The present invention is directed to providing graphical user interface widgets or interface elements that are viewable from different viewpoints in a volumetric display and, more particularly, to a system where a widget is produced that can be viewed and operated from multiple viewpoints.

2. Description of the Related Art

A class of three-dimensional (3D) displays, called volumetric displays, is currently undergoing rapid advancement. The types of displays in this class include holographic displays, swept volume displays and static volume displays. Volumetric displays allow for 3D graphical scenes to be displayed within a true 3D volume. Such displays can take many shapes, globes, domes, cubes, etc. with a dome being a typical shape. Because the technology of these displays is undergoing rapid development those of skill in the art are concentrating on the engineering of the display itself. As a result, the man-machine interface to or the ways in which people interface with these types of displays is receiving scant attention.

While the volumetric displays allow a user to view different parts of a true 3D scene, the act of viewing the different parts typically requires that the user physically move around (or over) the display or that the display be moved or rotated in front of the user. As the display moves relative to the user, graphical user interface elements, sometimes called widgets may also move relative to the user. This is a particular problem when the widget is a two dimensional interface, such as a virtual keyboard, or a display/view of a two dimensional document, such as a list or spreadsheet.

What is needed is a system that will provide user interface elements that are viewable and operable from whatever viewpoint a user takes around a volumetric display.

SUMMARY OF THE INVENTION

It is an aspect of the present invention to provide widgets that can be used in a volumetric display where one or more users can view the display and the widgets from different viewpoints and locations around the display.

It is another aspect of the present invention to orient the widgets to the users by tracking the location of the users.

It is also an aspect of the invention to provide omni-directionally viewable widgets.

It is an additional aspect of the present invention to replicate planar widgets, providing a widget for each user or cluster of users.

It is a further aspect of the present invention to provide widgets that rotate so that all users can view the widgets.

The above aspects can be attained by a system that provides a volumetric widget that can be viewed and interacted with from any location around a volumetric display. Such a widget can be provided by duplicating the widget for each user, by providing a widget with multiple viewing surfaces or faces, by rotating the widget and by orienting a widget toward a location of the user.

These together with other aspects and advantages that will be subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
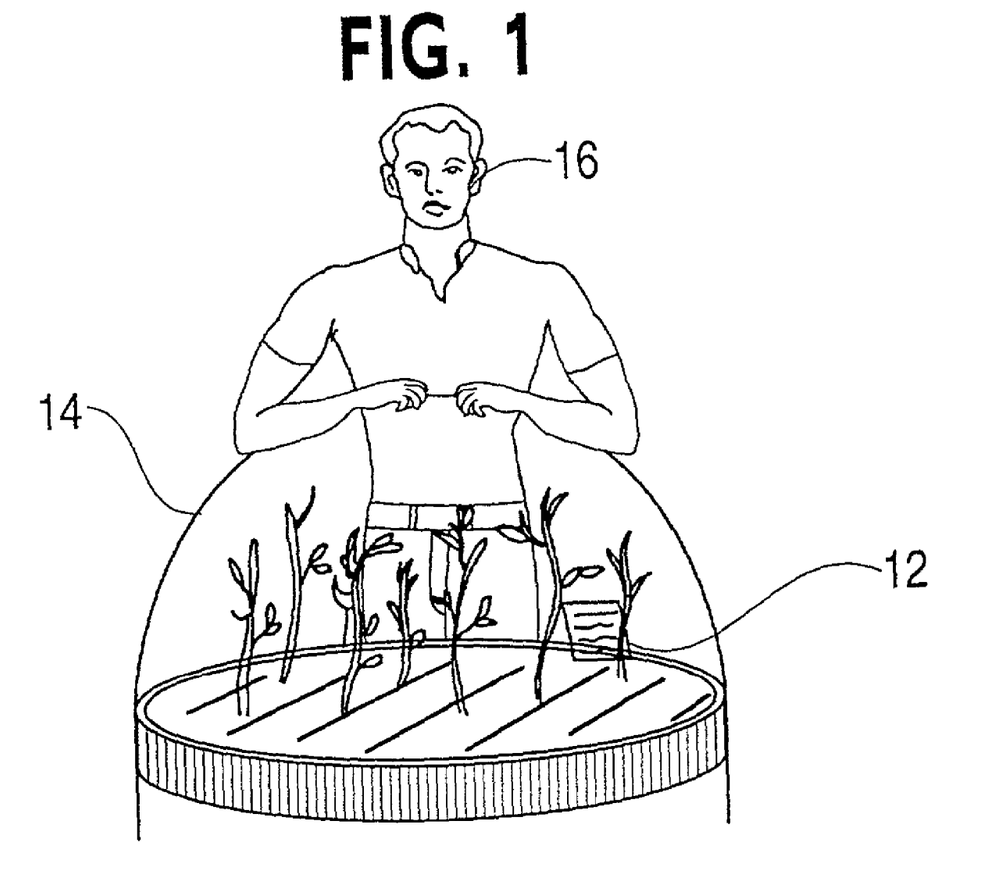
FIG. 1 depicts a volumetric display.
Figure 2:
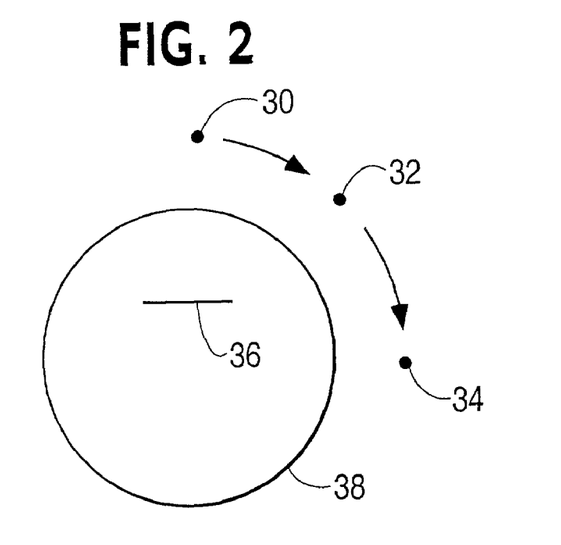
FIG. 2 shows a user viewpoint moving with respect to a planar user interface (UI) element (top view).

Volumetric displays allow a user to have a true three-dimensional view of a scene 12 and are typically provided in the form of a dome 14, as depicted in FIG. 1. The user 16, as can be surmised from FIG. 1, can move about the dome 14 to view different parts of the scene 12. As the user 16 moves (see FIG. 2) to different viewpoints 30, 32 and 34, a planar UI widget 36 within the volumetric display 38 relatively turns such that it is no longer viewable by the user as depicted in the top view of FIG. 2.

There are a number of different solutions to this viewability problem. The solutions include the production and display of a volumetric graphic user interface element or widget or omni-viewable widget. A volumetric widget or omni-viewable widget is one that can be viewed and interacted with from any user location or viewpoint around a volumetric display. One solution that provides a volumetric widget is to replicate a planar widget several times around the volumetric display so that the user will always have a readable view of the contents of the widget. This solution can result in a cluttered display. Another solution is to provide a multifaceted widget where a face of the widget is always readable by the viewer. This can result in a widget that takes up a greater volume of the display. A further solution is to provide a widget that rotates to facilitate viewing from any viewpoint. This can result in a widget that is readable only part of the time. A further solution is to track a position of the user and orient the widget to face the user's location. This solution requires tracking technology. An additional solution is to combine two or more of the solutions discussed above. Each of these solutions provides a volumetric or omni-viewable widget and will be discussed in more detail below.

Figure 3:
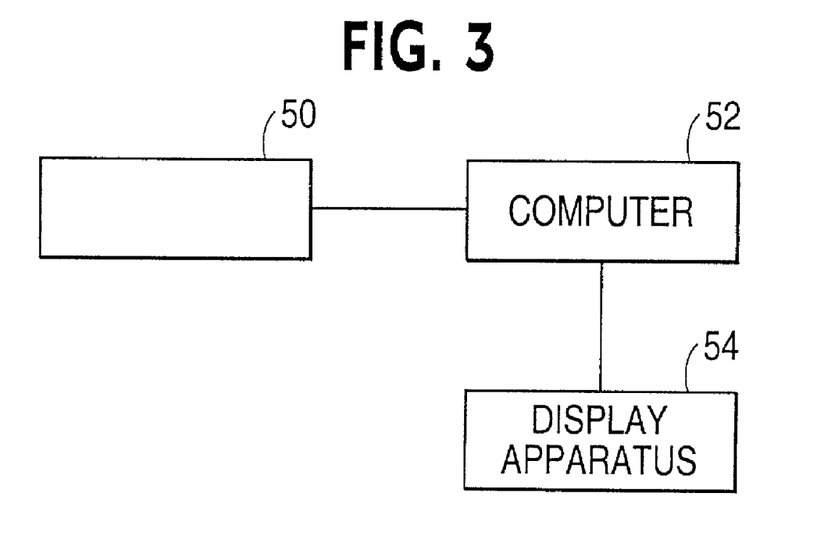
FIG. 3 depicts the hardware of the present invention.
Figure 4:
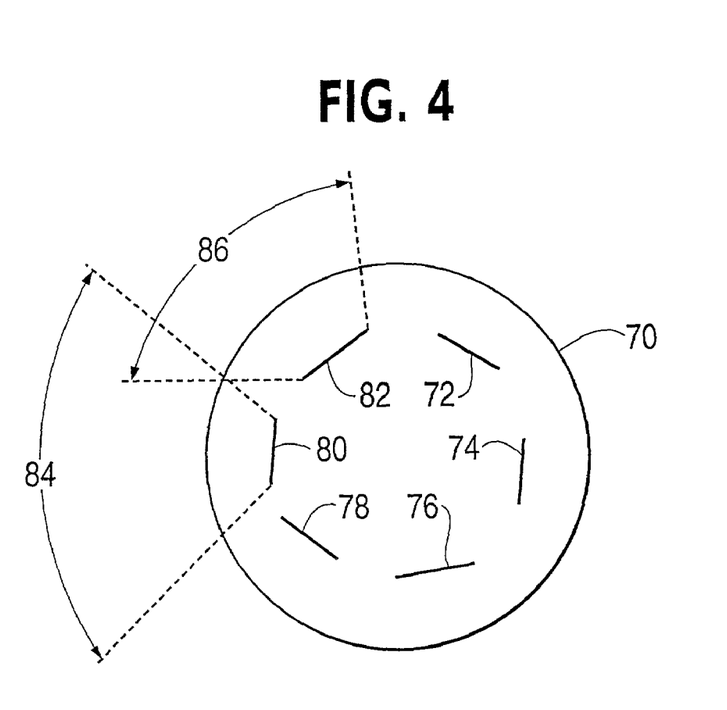
FIG. 4 shows view ranges of widget faces of a volumetric widget arranged to allow any location to view the widget.

The present invention is typically embodied in a system as depicted in FIG. 3 where physical interface elements 50, such as a rotary dome position encoder, infrared user position detectors, a keyboard, etc. are coupled to a computer 52. The computer 52 uses a graphical creation process, such as the animation package MAYA available from Silicon Graphics, Inc., to create a three-dimensional (3D) scene including virtual interface elements, such as the volumetric widgets discussed herein, and move them about in the scene automatically or based on some user control input. The display output, including the scene and widgets, is provided to a conventional volumetric display apparatus 54, such as one that will produce a 3D holographic display As depicted in FIG. 4, a display 70 can include a volumetric widget that comprises multiple duplicate copies 72, 74, 76, 78, 80 and 82 of a virtual interface element, such as a graphical slider or icon toolbox. Each of the elements 72–82 has a viewing angle range with, for example, element 80 having a range 84 and element 82 having a range 86. The elements are arranged or positioned in such a way that from any point around the display 70 a user is within the acceptable viewing angle range of one of the elements. This can be accomplished by providing a sufficient number of elements or by arranging the elements more or less deeply within the display such that the ranges of the adjacent elements overlap at or near the surface of the display 70. This is shown in FIG. 4 with the ranges 84 and 86 overlapping at the surface of the display 70. The ranges of adjacent elements need not overlap at the surface of the display 70 but can overlap at a predetermined distance from the surface responsive to an expected distance of typical user viewpoints from the surface.

Figure 5A:
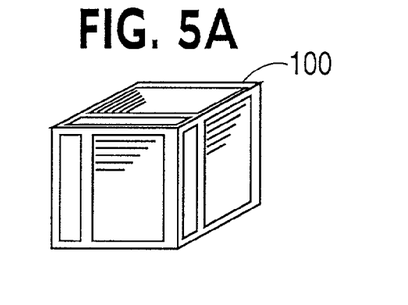
FIGS. 5A–5D depict omni-directional volumetric widgets.
Figure 5B:
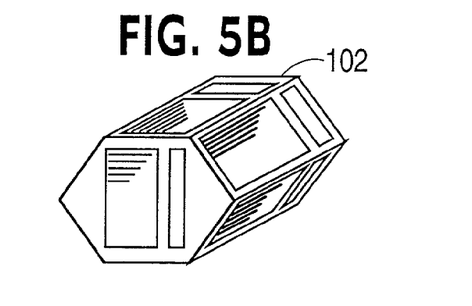
Figure 5C:
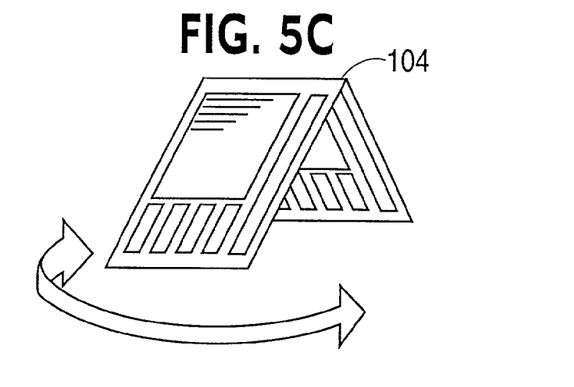
Figure 5D:
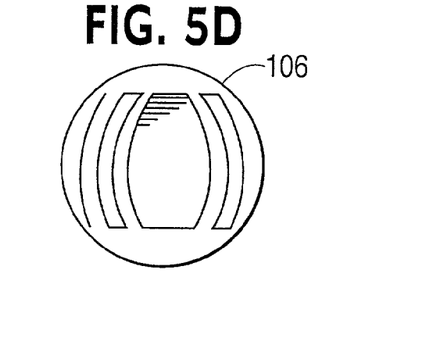

Omni-viewable widgets can be created by forming widgets with multiple faces or multiple surfaces as depicted in FIGS. 5A–5D. The faces are typically exact duplicates showing the same information in the same way. FIG. 5A depicts a cubical widget 100 with six faces and each face containing a duplicate of the contents to be displayed by the widget. FIG. 5B depicts an octagonal solid widget 102 with 8 faces and each face displaying the same contents. FIG. 5C depicts a tent type widget 104 with two faces, each facing the opposite direction and each displaying the same contents. This type of widget can also be rotated back and forth, as indicated by the arrows, to allow the viewing range of the two displays to intersect all user viewpoint positions. FIG. 5D depicts a globular or ball shaped widget 106 with identical faces arranged one the surface of the globe. Other shapes of multiple face widgets are possible such as pyramidal and cylindrical. Note that each face does not have to be an exact duplicate; a face may be specialized for a particular viewpoint. For example, if a widget is a direction widget (showing the compass directions), each face is not a literal duplicate as in this case, each face shows the directions appropriate to their viewpoint.

Figure 6:
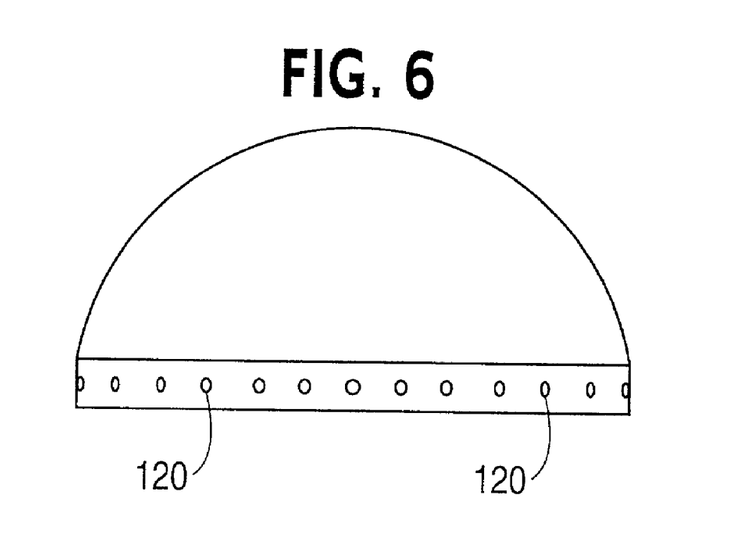
FIG. 6 shows a volumetric display with an array of user location detectors.

To rotate or move a widget to face a user the position of each user must be determined. The detection or determination of the position of a user or users can be accomplished in a number of different ways. For example, each user can be provided with a position indicator as part of an input device, such as that provided by a conventional 3D input glove. Input devices located around the display can also be used by the users to register their locations or viewpoints. A camera and an object detection system could also be used. Another alternative, as depicted in FIG. 6, is to provide an array of conventional infrared detectors 120 arranged in a circumferential band below or at the bottom of a volumetric display enclosure 122. In this approach those detectors that are active indicate the presence of a user. A conventional interface between the computer 52 (see FIG. 3) and the detectors allows the computer to conventionally detect the number and positions of users positioned around the display 122. Another variation is to use audio microphones to detect the position of users based on from where the sound is coming.

Figure 7A:
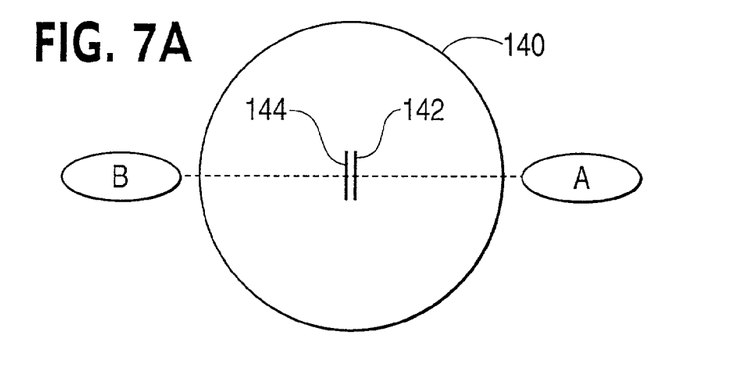
FIGS. 7A–7C show a volumetric widget with faces corresponding to and oriented toward user locations.
Figure 7B:
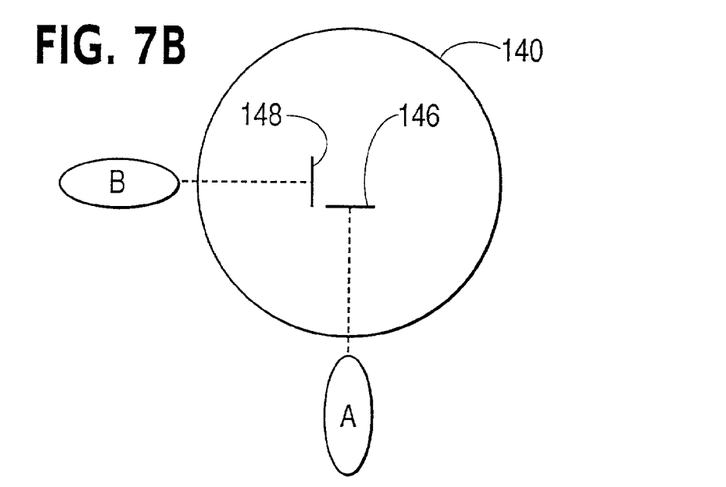
Figure 7C:
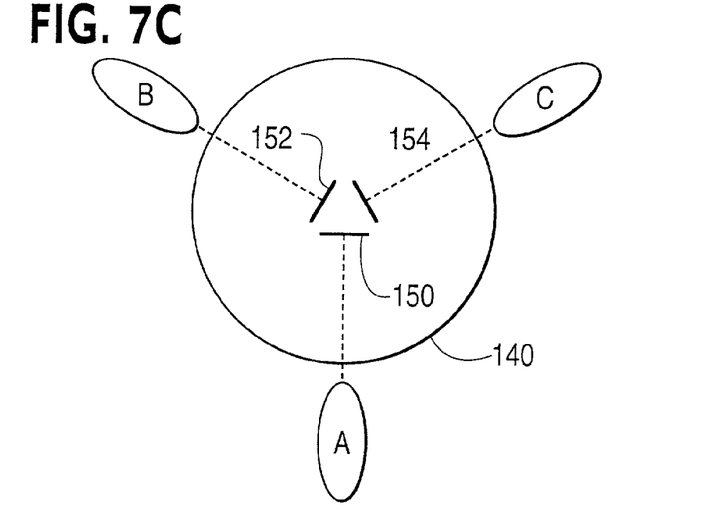
Figure 8:
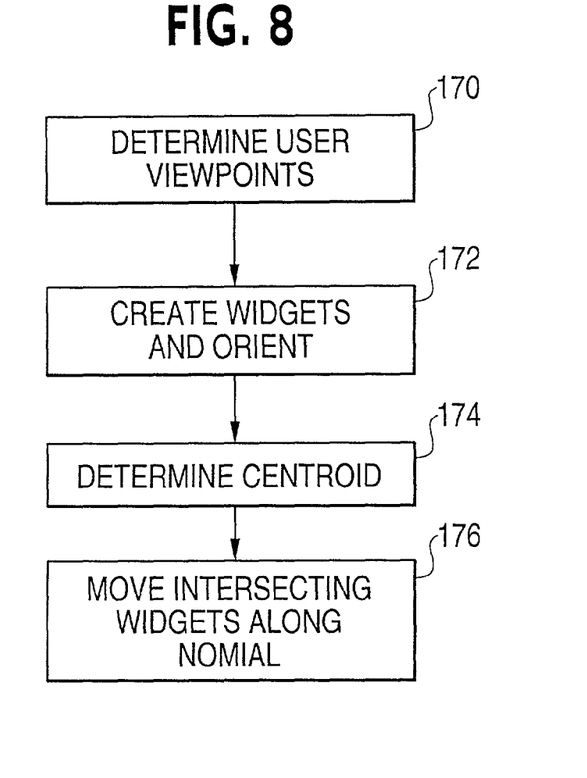
FIG. 8 is a flowchart of operations that prevent the faces of a volumetric widget from occluding each other.

When the number and positions of users are known, the computer can create a omni-viewable widget that includes an interface element for each user, as depicted in FIGS. 7A–7C. When the system detects two users A and B on opposite sides of the display enclosure 140, as depicted in FIG. 7A, two widgets elements 142 and 144 are created and positioned (as shown by the dashed lines) to face the users. FIG. 7B shows two users A and B in different positions than in FIG. 7A and widget elements 146 and 148 positioned to face these different positions. FIG. 7C shows three users A, B and C and three corresponding user-facing widget elements 150, 152 and 154. When the widget elements cannot be placed facing in opposite directions as depicted in FIG. 7A such as in FIGS. 7B and 7C, the system may need to prevent the widgets from overlapping each other and thereby obscuring display contents in the overlapped areas. This is discussed below with respect to FIG. 8.

Figure 9A:
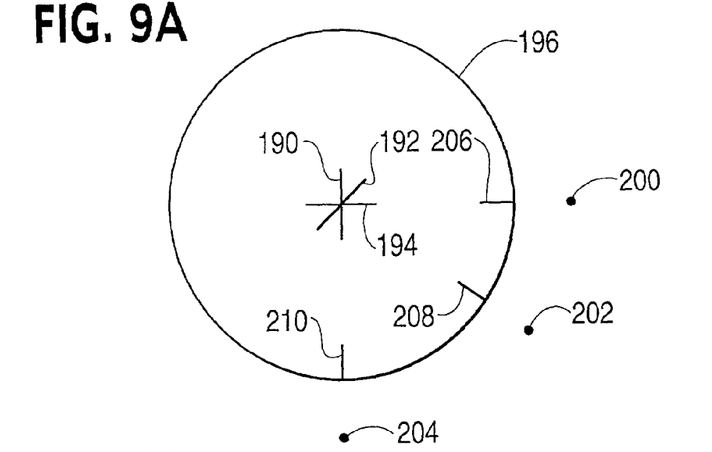
FIGS. 9A–9C depict a sequence of face movements to eliminate facial occlusion.
Figure 9B:
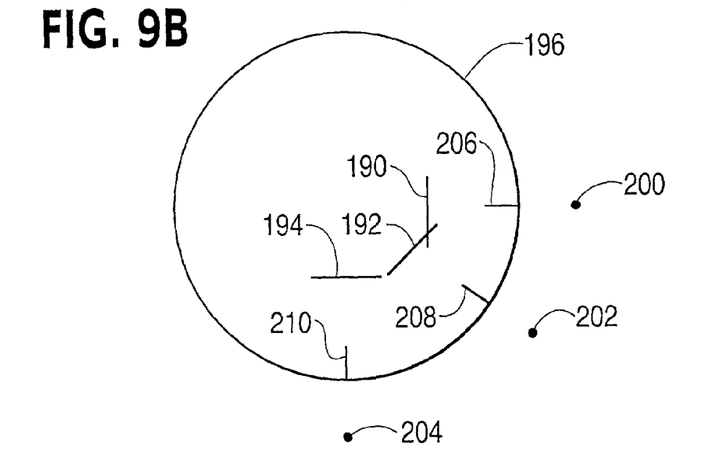
Figure 9C:
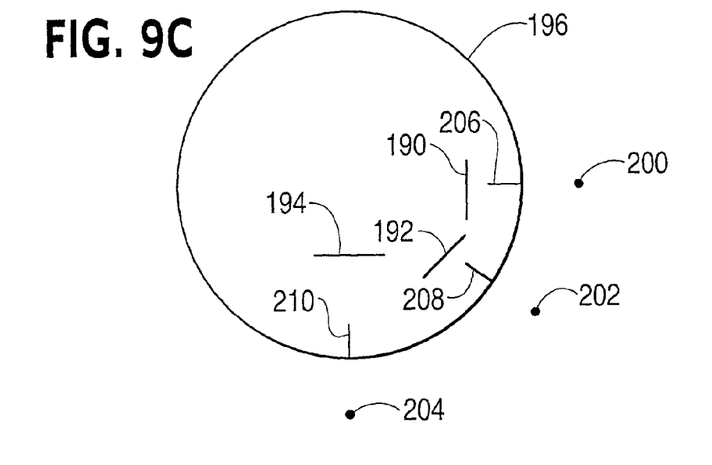

Initially, for an omni-viewable widget with an element for each user, the system determines 170 (see FIG. 8) the number of users and their positions or viewpoints using a position determination system such as previously discussed. For each viewpoint an identical widget element is created and oriented 172 in an orientation that is tangential to the surface of the display enclosure at the position of the corresponding viewpoint around the circumference of the display enclosure and perpendicular to the normal at that point. Next, the centroid of the oriented widget elements is determined 174. Widget elements that have surfaces that overlap or intersect are incrementally moved 176 away from the centroid radially along the normal until no intersections exist. The sequence of FIGS. 9A–9C show these operations in more detail.

Initially (see top view FIG. 9A) a widget with three widget elements 190, 192 and 194 is created in the center of the display 196 for three user viewpoints 198, 200 and 202. The widgets are moved along their respective normals 206, 208 and 210 until widget 192 no longer intersects with widget 194, as shown in FIG. 9B. At this point widget 194 stops moving. However, widgets 190 and 192 still intersect. As a result, widgets 190 and 192 are moved along their respective normals 206, 208 and 210 until they no longer intersect as shown in FIG. 9C. Rather than move only those widgets that intersect, it is possible to move all the widgets by the same incremental amount until no intersections exist. Other placement algorithms may be used to achieve a similar non-overlapping result.

Figure 10:
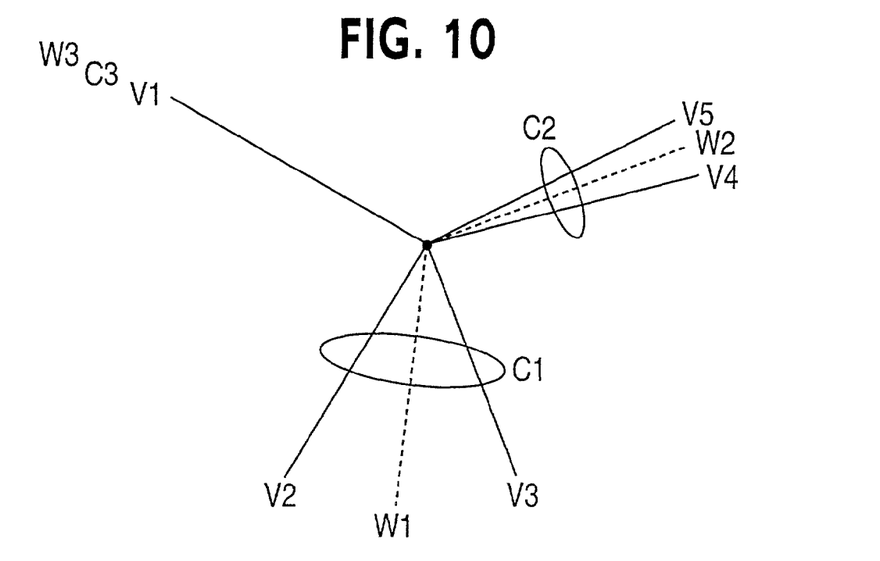
FIG. 10 shows clustering viewpoints.

Alternatively to moving the widgets radially along their normals to eliminate intersections, it is possible to group viewpoints into viewpoint clusters and create a display for each of the clusters. This is depicted in FIG. 10 where five user viewpoints V1–V5 are shown. In determining whether a viewpoint can be included in a cluster, the system measures the angles between the viewpoints and compares this to the view range of the particular widget element being created. If the angle is less than the range, the viewpoints can be included within the same cluster. For example, the angle between viewpoints V1 and V2 and between viewpoints V2 and V5 is greater than the viewing range of the widget element being used. The angle between V3 and V4 is also too great. However, the angle between V2 and V3 and between V4 and V5 is less than the range and these viewpoints can be grouped into two clusters C1 and C2 while V1 is allocated to its own cluster C3. Once the clusters are determined the average of the positions or angles of the viewpoints in each cluster is used to determine the angular positions W1, W2 and W3 of the widget elements.

Figure 11A:
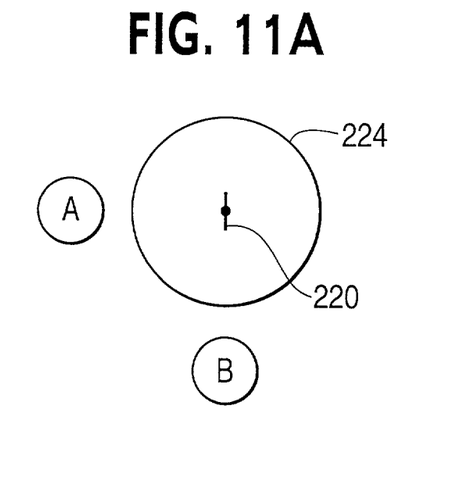
FIGS. 11A–11C shows back and forth rotation of a volumetric widget
Figure 11B:
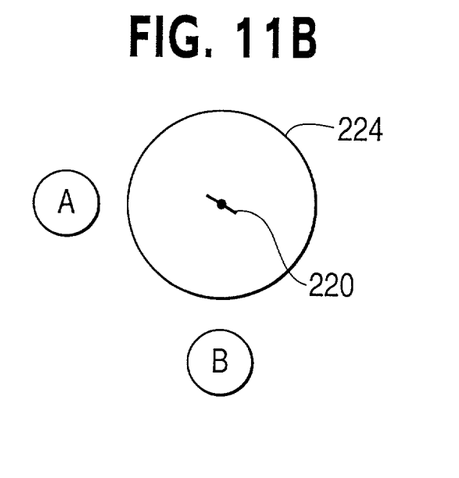
Figure 11C:
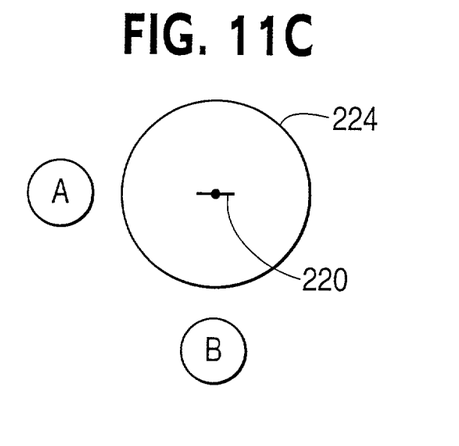

As noted above, it is also possible to continuously rotate the widgets. The rotation can be a revolution through 360 degrees or the rotation can rock back and forth through a fixed number of degrees to favor certain viewpoints. The rocking is depicted in FIGS. 11A–11C. In this sequence a widget 220 in the display enclosure 224 is rotated back and forth between the viewpoints of users A and B. In FIG. 11A the widget 220 is oriented to user A, in FIG. 11B the widget is oriented between users A and B, and in FIG. 11C the widget is oriented toward user B. This rotation between view points is performed by determining the user view points and redrawing the widget in sequential and incremental angular positions between the view points. The rotation in either mode can "jump ahead" resulting in certain viewpoints being ignored or covered at different rates. Furthermore, the widget can be rotated along an arbitrary axis or multiple axes.

When a rotating widget is selected by the user for an operation, such as by the user positioning a pointer pointing at the moving widget, and performing a selection operation, such as pressing a selection button on the pointer, the widget needs to be stopped from rotating so the user can review the widget for a desired period of time or otherwise interact with the widget. The operations involved in stopping the rotation of the widget are depicted in FIG. 12 and discussed below.

Figure 12:
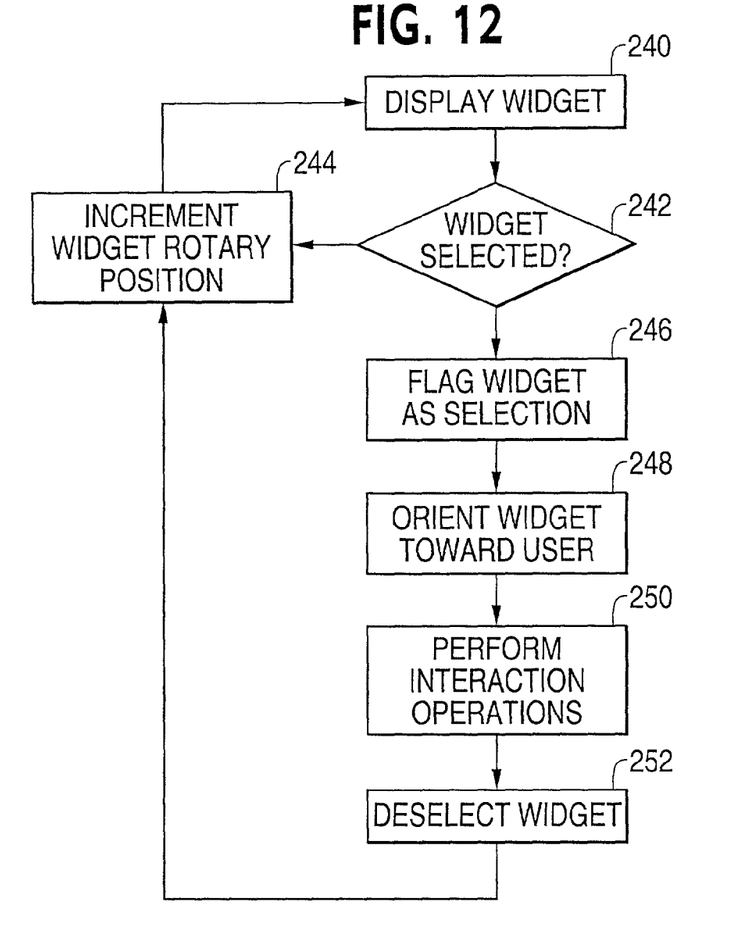
FIG. 12 depicts selection operations for a rotating widget.

The rotation of a widget, in either a back and forth motion or in a full circular motion includes a display 240 of the widget at a particular rotary position (see FIG. 12). The system then determines 242 whether the widget has been selected. Selection can occur in a number of different ways including the positioning of a 3D cursor on the widget and the activation of a selection button on a device, such as a 3D "mouse". If the widget has not been selected, the position of the widget is updated 244 and it is displayed 240 in its new rotary position. If the widget has been selected, the widget is flagged 246 as selected so that other users cannot select the widget. The selected widget can also be displayed in a way that indicates it has been selected, such as by highlighting it. The widget can then optionally be oriented 248 toward the user using the input from (or input vector of) a selecting device to determine which user has selected the widget and the user location as indicated by the location detectors. The correlation between location and selection device can be created by having the users register their location and their input device or by using input devices whose position around the volumetric display is known. The system then performs the interactions 250 with the widget as commanded by the user. If the user is only reviewing the contents of the widget then there is no positive interaction. The user can use the selecting device to move a cursor to select a control of the widget, thereby positively interacting with the widget. Once the interaction is finished or a time-out period expires, the widget is deselected 252 and the rotation of the widget continues.

Figure 13:
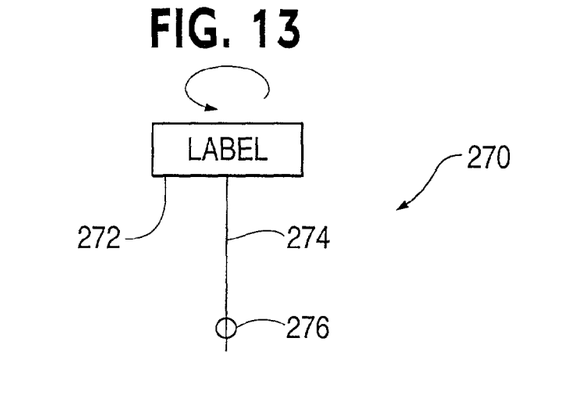
FIG. 13 shows a volumetric widget having a rotating part and a stationary control part.

As discussed above, it is possible to provide a rotating widget whose contents have controls making it appropriate to orient the widget toward the user when the user desires to interact with the widget. It is also possible to provide a widget that includes a control with which the user can interact while the widget is rotating without having the widget stop rotating and orient toward the user. Such a widget 270 is depicted in FIG. 13. This widget 270 includes a rotating portion 272 that can indicate the function of the widget via a label and a stationary portion 274 that includes the control 276. In this case the control 276 is a slider bead that the user slides up and down to perform some function, such as an object scale slider used to change the scale of a selected object in the display. Another example is a pushbutton implemented by a deformable sphere.

The rotating widget has been described with respect to rotating into view of the users with the widget remaining at the same position within the display. It is also possible for the widget to rotate in the display by traveling around the circumference of the display or the interior of the display enclosure much like a world rotates on a globe. In general any rotation pivot point or any path can be used to move a widget.

These paths are computed such that they route the widgets around objects that would occlude the widgets being viewed from certain viewpoints. One method for defining a path within a volumetric display to be used to move a widget along is to define two concentric rings along the base of the volumetric display. Call one ring the inner and the other the outer ring. The widget traverses along the inner ring until it's position plus a fixed delta amount intersects an object. With a collision imminent, the widget transitions to the outer ring until it is able to return to the inner ring—having passed the object. Additional "outer" rings can be defined if traversal along the current ring is not valid (e.g., intersecting an object). This same concept can work for other path shapes such as a rectangular path or a spiral path that has a width and height. Using this approach, widget movement is "content-dependent". In a similar manner, widget placement may be content-dependent such that a widget or widgets are not only oriented or duplicated but placed in the scene to minimize the occlusion of them by other content in the scene.

Omni-viewable widgets can also be of value in other virtual environments and display systems. For example, virtual environments that use head-mounted displays could benefit from omni-viewable widgets placed in a virtual world. In general, any application where different viewpoints of a 3D scene omni-viewable widgets can be viewed and operated from multiple viewpoints.

The present invention can be generalized to 2D displays (e.g., a display where a widget is viewable and operable from the top or bottom of the display). For example, sitting face-to-face at a table with a LCD display in the table surface between the two people. Each widget is replicated to be oriented toward each person. If four people gather around the display four versions of the widget are produced.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with respect to volumetric widgets that are display widgets that display data contents to the user. It is possible to provide widgets that not only output contents but also widgets that allow input to the graphics system using input data fields, cursor activatable controls, etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
   producing and displaying a three-dimensional scene in a volumetric display; and
   producing and displaying a volumetric interface element in the volumetric display, wherein the interface element comprises display faces arranged in separate non-adjoining locations within the volumetric display and each face having a viewing range where the viewing range of the faces cover the viewpoints of users around the volumetric display.

2. A method as recited in claim 1, wherein viewpoints are allocated into viewing clusters and a face is oriented along an average angle between the viewpoints in a cluster.

3. A method, comprising:
   producing and displaying a three-dimensional scene in a volumetric display; and
   producing and displaying a volumetric interface element in the volumetric display wherein the volumetric element comprises display faces corresponding one-to-one with users and oriented to face corresponding users.

4. A method as recited in claim 3, further comprising positioning the faces to eliminate occlusion by neighboring faces.

5. A method as recited in claim 4, wherein each face has a normal to a surface of the volumetric display and the positioning comprises:
   determining a normal to a surface of the volumetric display corresponding to each user location;
   placing the faces in a center of the volumetric display along their corresponding normals;
   determining a centroid of the faces;
   orienting the faces orthogonal to their corresponding normals along radials from the centroid to the corresponding user locations; and
   moving occluding faces along their corresponding normals until occlusion is eliminated.

6. A method, comprising:
   producing and displaying a three-dimensional scene in a volumetric display; and
   producing and displaying a volumetric interface element in the volumetric display, wherein the volumetric element comprises an omnidirectional element and wherein an omni-directional element comprises a multisided element with contents replicated on each side.

7. A method as recited in claim 6, wherein the multisided element comprises one of a cube, a globe and a hexagonal solid, the multisided element having faces each with a viewing range and the viewing ranges of the faces covering the viewpoints of users around the volumetric display.

8. A method, comprising:
   producing and displaying a three-dimensional scene in a volumetric display; and
   producing and displaying a volumetric interface element in the volumetric display wherein the volumetric element comprises a rotating face rotating into view of the users, and wherein the rotating face comprises one of a face revolving continuously through 360 degrees and a facerocking back and forth through a predetermined number of degrees.

9. A method as recited in claim 8, further comprising orienting the rotating face toward a user selecting the volumetric element.

10. A method as recited in claim 8, wherein the volumetric element further comprises a stationary control associated with the rotating face.

11. A method, comprising:
    producing and displaying a three-dimensional scene in a volumetric display;
    producing and displaying an omni-viewable widget in the display, where omni-viewable widget comprises display faces arranged in separate non-adjoining locations within the volumetric display, corresponding one-to-one with users and oriented to face corresponding users and each face having a viewing range where the viewing range of the faces cover the viewpoints of users around the volumetric display; and
    positioning the faces to eliminate occlusion by neighboring faces, where each face has a normal to a surface of the volumetric display and the positioning comprises:
    determining a normal to a surface of the volumetric display corresponding to each user location;
    placing the faces in a center of the volumetric display along their corresponding normals;
    determining a centroid of the faces;
    orienting the faces orthogonal to their corresponding normals along radials from the centroid to the corresponding user locations; and
    moving occluding faces along their corresponding normals until occlusion is eliminated.

* * * * *